Mar. 6, 1923.

W. C. STEVENS 1,447,441

MACHINE FOR MAKING TIRE CARCASSES

Original Filed Apr. 17, 1915     3 sheets-sheet 1

Witness:
John W. Kittredge
G. L. Ely

Inventor
William C. Stevens.
By
Attorney

Mar. 6, 1923. 1,447,441
W. C. STEVENS
MACHINE FOR MAKING TIRE CARCASSES
Original Filed Apr. 17, 1915    3 sheets-sheet 3
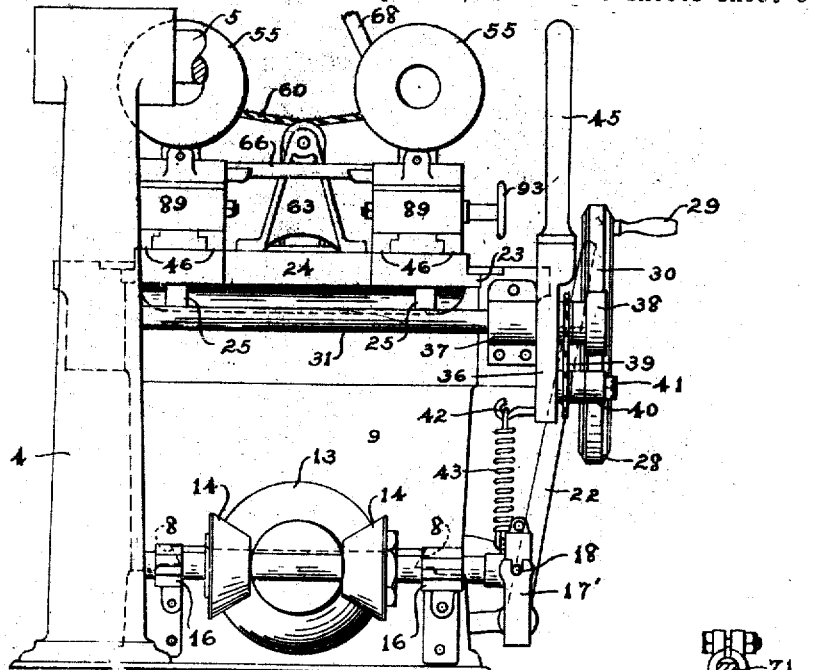
Fig. 3.
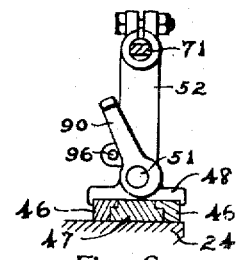
Fig. 6.
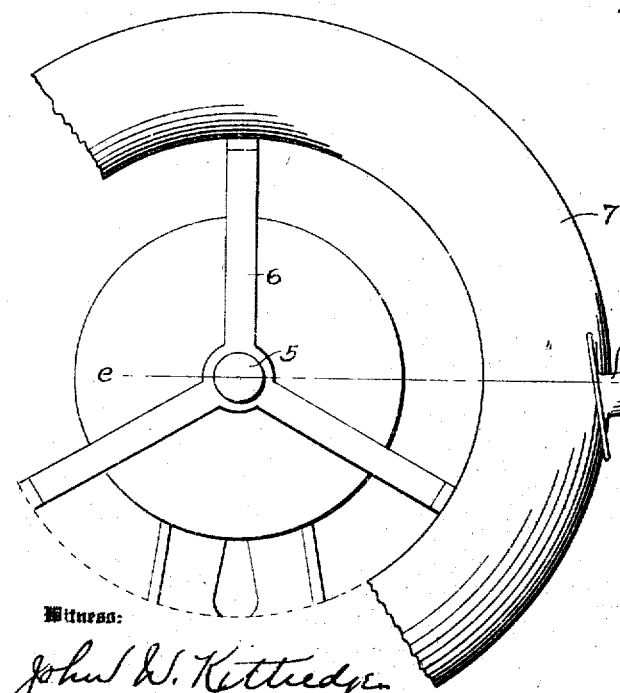
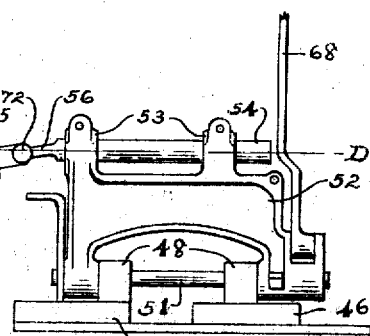
Fig. 7.
Witness:
John W. Kittredge
A. L. Ely
Inventor
William C. Stevens.
By
Attorney Patented Mar. 6, 1923.

1,447,441

UNITED STATES PATENT OFFICE.

WILLIAM C. STEVENS, OF AKRON, OHIO, ASSIGNOR TO THE FIRESTONE TIRE AND RUBBER COMPANY, OF AKRON, OHIO, A CORPORATION OF OHIO.

MACHINE FOR MAKING TIRE CARCASSES.

Application filed April 17, 1915, Serial No. 22,061. Renewed December 26, 1919. Serial No. 347,635.

*To all whom it may concern:*

Be it known that I, WILLIAM C. STEVENS, a citizen of the United States, residing at Akron, in the county of Summit and State of Ohio, have invented certain new and useful Improvements in Machines for Making Tire Carcasses, of which the following is a specification.

In a companion patent application, Serial No. 760,615, filed April 12, 1913, now Patent 1,253,105, Jan. 8, 1918, I set forth a structure for the manufacture of the "carcass" of the outer shoes or casings of pneumatic tires, wherein the rubber impregnated fabric is formed and shaped about a revoluble core by suitable spinning or fabric pressing rollers tilted to effect a sidewise stretching action on the fabric as it is rolled down into place on the core. In such structure the spinning rollers are mounted on levers or rocking arms in such a manner that as the levers or arms rock the angles of the rollers to the core change materially and the reduction or avoidance of such objectionable feature is one of the leading objects of the present invention.

A further feature of the invention resides in so constructing and assembling the parts of the mechanism that it is unnecessary to support the rollers at a tilted angle, but retaining, however, the effect of tilted rollers.

Other objects of this invention are to improve the form of stitchers and the mechanism for advancing into operative position the carriage carrying the stitchers.

Other features of novelty and improvement will become apparent to those skilled in this art from a consideration of the following detailed description of preferred embodiments of the invention, as shown in the accompanying drawings, in which like reference numerals refer to like parts and in which:

Figure 3, is a front elevation with the core structure omitted.

Figure 4, is a rear view of the stitcher carrying arms in the inmost position.

Figure 5, is a longitudinal section through the improved sitcher.

Figure 6 is a section on the line 6—6 of Figure 2.

Figure 7 is a view showing a modification.

Figure 1:
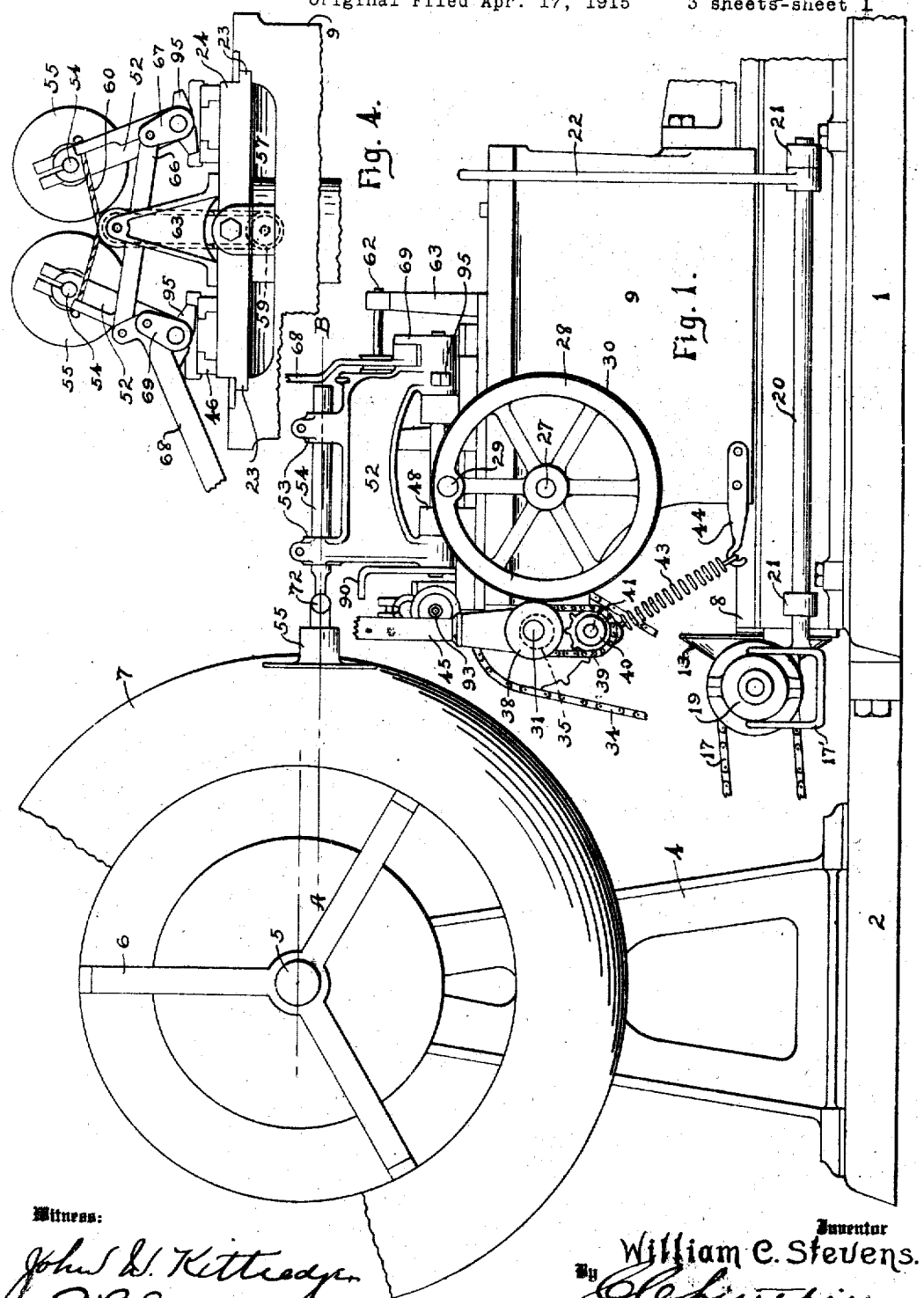
Figure 1, is a fragmentary elevation of the structure, and illustrates the carriage carrying the stitchers.
Figure 2:
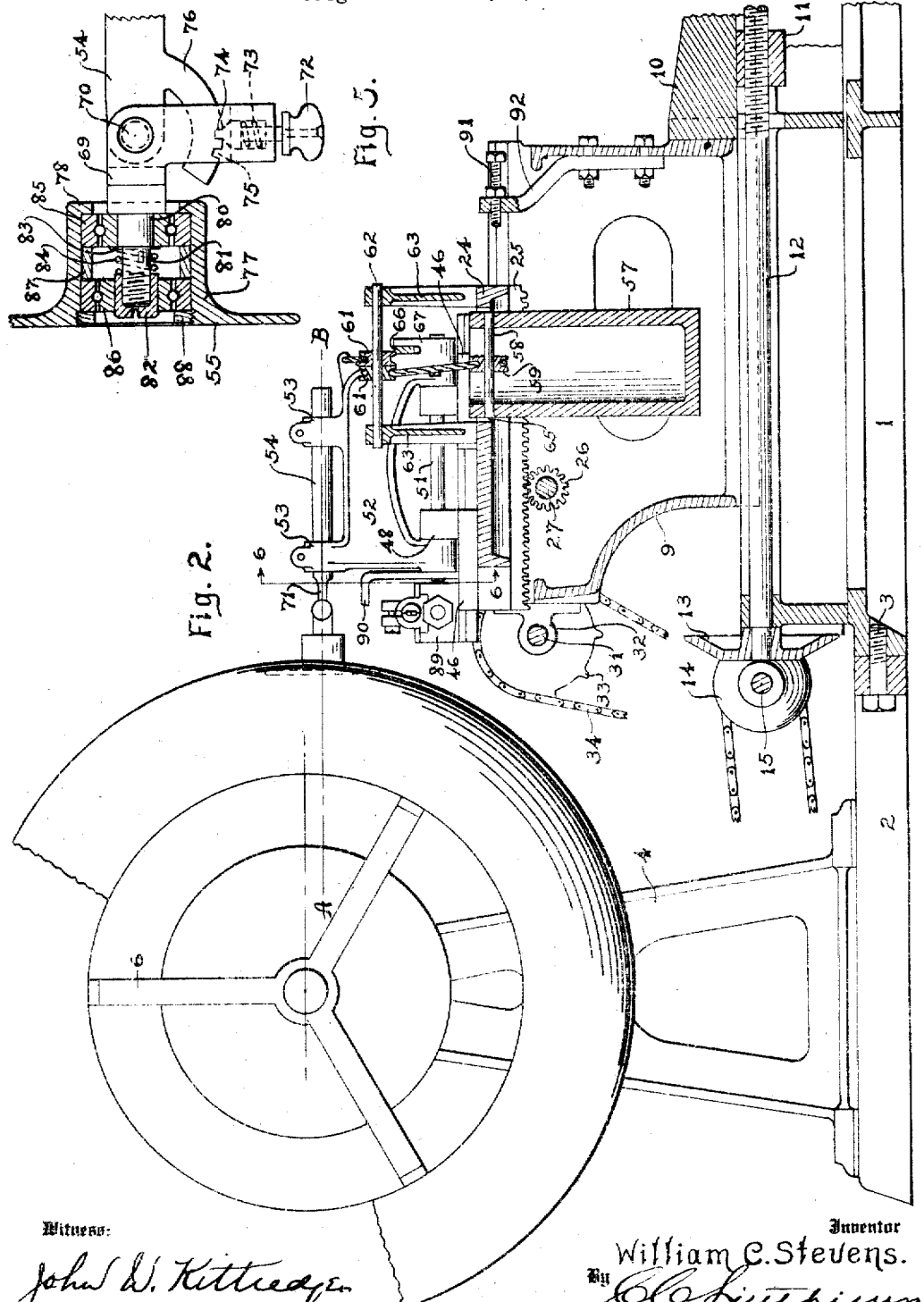
Figure 2, is a longitudinal section through the central part of the improved machine.

In this application, I have not shown the fabric carrying or stretching mechanism or the structure for rotating the core at slow and fast speed during the fabric stretching and applying operation and the fabric stitching or spinning operation respectively, as these mechanisms form no part of the present invention, and are separate and distinct therefrom. The showing of these parts is furthermore not necessary to the understanding of the machine.

The base of the machine is formed in two parts, 1 and 2 connected to form an L-shaped plate by means of bolts 3.

On the part 2 at one side of the machine is mounted a standard 4 in the upper part of which is rotatably mounted a shaft 5 adapted to carry and rotate any preferred form of spider 6, which carries the ordinary core 7 on which the tire is formed. The shaft and core are adapted to be rotated at either fast or slow speed by any form of mechanism not shown, as is well known in the art.

The upper part of the base 1 is formed with a dove tailed guide shown in dotted lines at 8 in figure 3 in which is adapted to slide a hollow carriage 9, serving as a support for the stitchers and their immediate operating mechanism. The rear end of the carriage 9 is provided with a tail piece 10 carrying on its under side a fixed nut 11. This nut is adapted to engage the screw threaded end of a longitudinal shaft 12, which extends through the base 1 and is provided at its forward end with a friction cone 13. The shaft 12 is adapted to be rotated in either direction when it is desired to feed the carriage 9 into or out of position for the stitching operation by means of two oppositely facing cone pulleys 14. These cones 14 are secured to a shaft 15, which is rotatably and slidably mounted in bearings 16, rising from the base of the machine. Shaft 15 is rotated from any other part of the machine by suitable means such for example as the sprocket chain 17. The shaft normally stands with the cones 14 out of engagement with the cone pulleys 13, but it is adapted to be moved to bring one or the other into driving engagement with the pulleys 13 by means of spanner arms 17', which engage pins 18 on the collar 19 carried by the shaft in the well known manner. The spanner arms are secured to the forward end of a rock shaft 20 mounted in bearing 21 secured to the base of the machine. A hand lever 22 is fastened to the rear end of the rock shaft and provides means for throwing the shaft 12 into action.

On the upper side of the carriage 9 are formed rabbets 23 in which is slidingly mounted a plate or secondary carriage 24 which carries the stitcher arms and the knife carrying slides as will be explained later. The under side of the plate 24 has secured thereto on each side a rack 25, which are in engagement with pinions 26 secured to a transverse shaft 27 rotatably mounted in the sides of the carriage 9. Shaft 27 extends outside the carriage 9 at the side adjacent to the levers and has secured thereto a hand wheel 28, carrying an operating handle 29. The periphery of the hand wheel is provided with a frictioned surface 30, usually rubber for machine drive as will be explained. By actuation of the hand wheel 28, the slide 24 may be advanced during the stitching operation. This may be done by hand by operator, by actuation of the handle 29, or may be done by the machine at fast or slow speed. I have found it advisable to feed the carriage forwardly at a relatively rapid rate during the major portion of the stitching operation, but while the fabric is being applied over the top of the bead, it is better to advance the carriage slowly as this allows the stitchers to pass over the bead without danger of dislodging it, and also for the purpose of securing better results in stitching over the top and the edge of the bead as will be readily understood by those familiar with the art.

The machine feed of the plate 24 is effected by the following means:

On the front face of the carriage 9 is mounted a transverse shaft 31 the left hand end of which, as viewed in Figure 3, is mounted so as to allow a slight play in the bearing 32 on the front of the carriage 9. This end of the shaft carries a sprocket wheel 33 over which passes a chain 34 driven by any suitable means. The right hand end of the shaft 31 is rotatably mounted in an eccentric hub 35 of a bearing plate or arm 36. Hub 35 is rotatably mounted in a bearing 37 on the carriage 9. The end of this shaft extends through the bearing plate and carries on the end a drive wheel or roller 38. The shaft 31 is connected by chain and sprocket connection 39, with a small roller 40 mounted to rotate on a pin 41 secured in the lower end of the plate 36. Such lower end of this plate also carries a hook pin 42 to which is connected one end of a spring 43, the other end of which is secured to a hook 44 in the lower part of the carriage 9. The upper face of the bearing plate has secured thereto an operating handle 45, by which it may be worked.

The operation of the parts just described is briefly as follows:

The shaft 31 is given a constant rotation by the sprocket connection and this rotation is transmitted to the drive wheels 38 and 40. Spring 43 is so connected to the bearing plate that it maintains the handle tilted to the left a little, which position owing to the eccentric hub, holds the two wheels 38 and 40 out of contact with the surface of the hand wheel 28. When it is desired to feed the plate 24 forward at the faster speed, the handle 45 is moved toward the position shown in Figure 1, whereupon the pulley 38 is forced into driving contact with the hand wheel 28, thus advancing the plate owing to the rack and gear connection 25 and 26 which advance will be relatively rapid, due to the size of the pulley 38. When, however, it is desired to advance the plate slowly as in stitching over the bead, the handle 45 is swung to the left, which rotates the hub 35 in the bearing 37 and brings the small pulley 40 into driving connection with the surface of the hand wheel.

On the top of the plate 24 on each side at the front and rear thereof, is secured a pair of oppositely facing spaced overhanging guide plates 46. Between each pair of these guides 46 is mounted a slide 47 designed to carry a knife for trimming the tire carcass as will be described later. Across each pair of guides 46 is secured a transverse bridge piece 48, rotatably mounted in which is a shaft 51, to which is secured an arched rocking stitcher carrier 52. The upper edge of the carrier is provided with split clamping lugs 53, in which is secured a stitcher carrying arm 54 provided at its forward end with a stitcher or fabric applying and pressing roller 55.

In my prior application, Patent 1,253,105, I have set forth at length the advantages which arise from a construction in which the stitcher is oblique to the path of the core at the point of contact of the stitcher and the material. In the said application I showed one machine which I had devised to embody this construction, but the machine shown therein developed certain disadvantages which it has been my purpose to overcome in the improved machine herein shown and described. In the preferred form of my invention as shown in Figures 1 to 6, I obtain the obliquity of the stitcher to the core not by tilting the roller, but by elevating the core so that its center is above the center of the shaft 54 as indicated in the dotted line "A—B" in Figures 1 and 2. It will be seen by this construction that the effect of tilting is obtained by a much simpler construction than that shown in the former application.

In my former construction and in all other structures of tire machines of this type of which I am aware, the axis of pivotal movement of the stitcher in order to pass over the sides of the core has been so located that the angle of the face of the stitcher with the plane of the core has changed as the stitcher moves inwardly. I have found that the best results are obtained with the face of the stitchers perpendicular to the plane of the core during the inward movement, and with the right angle thus formed held constant.

The maintenance of this angle is obtained by arranging the axis of pivotal movement of the stitchers in such manner that the face of the stitchers will be at right angles to the plane of the core at all times during its movement toward and away from the plane of the core. This is also obtained by making the axis of the pivotal movement parallel to the line of advance of the stitchers.

The action of the stitcher due to the combined perpendicularity of the face thereof, the tilt to the path of movement of the material at the point of contact and the maintenance of the same angle of the stitcher to the face of a core is superior to the action of any arrangement of stitchers which I have tried and secures the best results in laying the fabric about the side of the core.

In the modification shown in Figure 7, I have obtained almost as efficient results by making a slight bend in the stitcher end of the arm 54 as indicated at 56, whereby to tilt the stitching roller. In this form I have mounted the major or horizontal portion of the arm 56 on a line with the center of the core as shown at C—D. It will be seen that in this style of structure, I have obtained the obliquity of the stitcher with the path of movement of the core by bending the stitcher arm, but, owing to the practical impossibility or difficulty of forging two of these arms at exactly same angle, and owing to the fact that in the pivotal movement about the axis 51, the angle of the stitcher with the plane of the core and the obliquity of the stitcher relative to the path of movement of the material varies to a slight degree owing to the bend of the arm, I do not consider this quite as nearly perfect as the other form shown herein. It is, however, the same for practical purposes.

The pivotal movement of the part 52 about the axis 51 is obtained by the following means:

The stitcher carriers or rockers 52 are constantly urged toward one another by means of a weight 57 having in the upper end a pin 58 on which is mounted a pulley 59. A rope or cable 60 is secured at each end to the rear of one of the carriers 52 and passes from each point of attachment over a revoluble pulley 61 mounted on a spindle 62 carried in brackets 63 supported on the upper surface of the plate 24 on either side of a hole 65 through which the upper end of the weight 57 is adapted to pass. The stitcher carriers are kept apart against the action of the weight by means of a link 66, one end of which is pivotally connected with a lug 67 integral with the stitcher carrier 62 further away from the operator as he stands at the side of the machine as shown in Figure 1. The other end of the link is connected pivotally to the short end of a bell crank lever 68, the knee of which is fulcrumed on lug 69 integral with the nearer stitcher carrier. The movement of the stitchers in either direction is limited by lugs 95 on the base of the stitcher carriers which contact with the upper surface of the rear guide 46.

In Figure 4 are shown the stitchers in their extreme inward position and in Figure 3 in their extreme outward position.

By the construction just described it will be seen that the two stitchers are subject to a common weight and are, therefore, urged together with equal pressure. In passing over the sides of the tire carcass, the joints or splices of the plies are likely to cause jumping or vibration of the stitchers. Handle 68 held by the operator, serves the purpose of steadying the stitchers, in the operation or advance movement of the carriage. It is also possible to vary the effective action of the weight by means of this handle and to increase or decrease the pressure on the stitchers over that exerted by the weight. The vertical arrangement of this lever aids in the accomplishment of this result over the previously tried horizontal lever as can be readily understood.

In order to stitch the fabric and apply it to the under side of the bead, it is necessary that the angle of the stitcher be changed as explained more in detail in the prior application referred to. In order to do this, instead of mounting my stitcher directly on the arm 54, it is carried on the end of a right angle bracket 69 pivotally mounted at 70 on the end of the arm 54 which is flattened at 71 for this purpose. The other end of the bracket 69 which projects outwardly from the arm 54 is provided with a sliding lock pin 72, which is constantly urged inwardly by a spring 73. The inner end of the pin 72 is flattened and adapted to be received in one of two notches 74 and 75 in an arc shaped extension 76 of arm 54.

When the end of the pin 72 is engaged in the notch 74, the face of the stitcher will be perpendicular to the plane of the core, which position of the stitcher is maintained during the greater part of the carcass forming operation. When, however, it is desired to apply the fabric to the inner face of the bead, the pin 72 is pulled out and the stitcher moved around on the pivot 70 until the pin passes into the notch 75 under the influence of the spring. The angular position of the stitcher relative to the plane of the core, and the obliquity of the stitcher relative to the path of movement of the material at the point of contact, are both factors which contribute to the perfect application of the fabric. Unless the stitcher is turned so that its face is at an acute angle to the plane of the core, it is impossible for the stitcher to get between the flange of the core and the bead. If now, this is done without tilting the stitcher, the working edge thereof both above and below the axis will contact the fabric being applied to the bead, which will result in tearing off the fabric by the outwardly moving edge of the stitcher as fast as it is put on by the inwardly moving edge. The obliquity or the tilting of the stitcher obviates this difficulty, for by this expedient, all of the inwardly moving working edge of the stitcher touches the entire inner surface of the bead, at the same time, and smoothly and evenly applies the fabric over the whole under surface of the bead.

I have found that in going over the plies, if the stitcher is held rigid in the axial direction the over-lapping ends of the plies will be rubbed. In my prior application above referred to, I sought to obviate this difficulty by making the stitcher yieldable axially in both directions, but I found that this was too uncertain and the stitchers were apt to wobble unduly.

I have improved the construction by the mechanism shown in Figure 5, in which the stitcher is shown as provided with a hollow hub 77, the rear of which carries an inturned flange 78. The stitcher carrying end of the bracket 69 is provided with a reduced cylindrical portion 80 and with a still further reduced cylindrical screw threaded end 81. A screw threaded cap 82 is mounted over the end 81 and around the base is loosely mounted a washer 83 which is larger in diameter than the portion 80. Between the washer and the cap is mounted a spring 84.

In the hollow hub 77 about the part 80 and held between the shoulder formed at the end of the arm 69 and washer 83 is slidingly mounted a ball bearing 85. In the forward part of the hub 77 about the cap 82 is mounted a second sliding ball bearing 86, the two ball bearings being spaced apart by a collar 87. The stitcher 55 and the ball bearings are held rigidly together by a screw threaded ring 88 secured to the stitcher face and a little below the level thereof.

By the construction just described it will be seen that a slight forward axial movement of the stitcher is allowed which is sufficient to prevent injurious rubbing of the overlapping plies.

The knives for trimming the edges of the tire carcasses are no part of my present invention, and I have not shown them in detail for this reason, but they are shown at 89, and each one is secured to the forward end of a slide 47, which are freely movable in and out. This together with the operation of the hand wheel 28 gives a quick and simple means of adjustment. The slide is locked to the plate by means of a cam latch 90 pivoted at the forward end of each shaft 51 under the stitchers, the cam latch being limited in its loose or unlocking position by a pin 96 in the stitcher carrier 52.

Backward movement of the slide 24 on the carriage 9 is limited by a set screw 91 arranged in the upper end of a bracket 92 secured to the rear inner face of the carriage 9.

In the operation of the machine a layer of fabric having been applied to the core and the carriage 9 run up to the proper position by manipulation of the lever 22, the stitchers are brought up to the proper point on the side of the core by manipulating the hand wheel 28 and the lever 68. The core is then revolved at fast speed and the lever 45 pressed over towards the right as shown in Figure 1. This forces the large pulley 38 in contact with the periphery of the hand wheel and the slide 24 is advanced. The movement of the stitchers over the sides of the core is steadied by the operator who holds the lever arm 68 with one hand while he presses to the right on the lever arm 45 with the other. This operation is continued until the stitcher completes the forming of fabric about the sides of the core, when the handle 45 is released stopping the advance. The operator then draws the lever 68 up separating the stitchers as shown in Figure 3 and runs the slide back by operation of the hand wheel. This series of operations is continued until the bead is placed on the carcass. The first layer is placed over the bead and is stitched down as before until the junction of the bead and the side of the core is reached. The operator then presses the handle 45 to the left as shown in Figure 1. This action on the part of the operator causes the small pulley 40 to come into action, which advances the stitcher at slow speed allowing it to climb up to the top of the bead, without displacing or injuring it. It is also necessary to advance the stitcher slowly over the top of the bead as owing to the small radial advance of the stitcher at this point, should it be advanced at a rapid rate, the stitching of the fabric over the bead would be slighted. At the same time, the action of the weight may be lessened by giving a slight upward pull on the lever 68.

When the top of the bead is reached the advance of the stitcher is stopped and it is swung around on the pivot 70 until the pin engages the notch 75. The lever 45 is then pushed to the right, thus advancing the stitcher down the side of the bead.

This series of operations is continued until the requisite number of plies is laid on the carcass, and over the bead.

The stitcher having been moved back out of the way, the knives are brought to their proper position and locked by the cam latch 99. The slide is then held stationary by holding the wheel 28 while the core is rotated and the knives fed inwardly by the hand wheels 93.

It is obvious that various changes and modifications might be made in the machine as shown and described without changing the scope of the invention or losing any of the benefit thereof as set forth in the appended claims.

What I claim is:

1. In a machine of the character described, the combination of a revoluble core, a fabric shaping tool, a support for said tool mounted to permit movement of the tool toward and from the side of the core in a direction at right angles to the plane of the core, and means to cause said tool to advance across the side of the core in a straight line to shape and form the tire fabric to the core.

2. In a machine of the character described, the combination of a revoluble core, a fabric shaping tool, a support for said tool mounted to permit rocking of the tool toward and from the side of the core in a direction at right angles to the plane of the core, and means to cause said tool to traverse the side of the core to shape and form the tire fabric thereto.

3. In a machine of the character described, the combination of a revoluble core, a tire fabric shaping tool located in a plane oblique to the path of rotation of the core at the point of action of the tool on the core and a support for said tool mounted to permit movement of the tool toward and from the side of the core in a direction at right angles to the plane of the core, substantially as described.

4. In a machine of the character described, the combination of a revoluble core, a tire fabric shaping roller located in a plane oblique to the path of rotation of the core at the point of action of the roller on the core, a support for said roller mounted to permit rocking of the roller toward and from the side of the core in a direction at right angles to the plane of the core.

5. In a machine of the character described, the combination of a revoluble core, a tire fabric shaping tool located in a plane oblique to the path of rotation of the core at the point of action of the tool on the core, a support for said tool mounted to permit movement thereof toward and away from the side of the core in a direction at right angles to the plane of the core, and means to cause said tool to traverse the side of the core and shape the tire fabric thereto.

6. In a machine of the character described, the combination of a revoluble core, a tire fabric shaping roller located in a plane oblique to the path of rotation of the core at the point of action of the roller on the core, a support for said roller mounted to permit rocking of the roller toward and from the side of the core in a direction at right angles to the plane of the core, and means to cause said roller to traverse the side of the core and shape the tire fabric thereto.

7. In a machine of the character described, the combination of a revoluble core, a tire fabric shaping tool, and a support for said tool permitting it to move around the core while shaping the fabric without changing its angle to the plane of the core.

8. In a machine of the character described, the combination of a revoluble core, a tire fabric shaping roller and a support for said roller permitting it to move around the core while shaping the fabric without changing its angle to the plane of the core.

9. In a machine of the character described, the combination of a revoluble core, a tire fabric shaping roller whose face is oblique to the path of the material at the point of contact of the material and the roller, and a support for said roller permitting it to move toward and from the side of the core without changing its angle to the plane of the core.

10. In a machine of the character described, the combination of a revoluble core, a tire fabric shaping roller whose face is oblique to the path of the material at the point of contact, and a support for said roller permitting it to move toward and from the side of the core without changing its obliquity, and without changing its angle to the plane of the core.

11. In a machine of the character described, the combination of a revoluble core, a tire fabric shaping tool, and a support for said tool permitting it to move around the core to shape the fabric without changing its angle to the plane of the core, and means to feed said tool along the side of the core.

12. In a machine of the character described, the combination of a revoluble core, a tire fabric shaping roller, a support for said roller permitting it to move around the core to shape the fabric without changing its angle to the plane of the core, and means for feeding said roller along the side of the core.

13. In a machine of the character described, the combination of a revoluble core, a tire fabric shaping roller whose face is oblique to the path of the material at the point of contact, a support for said roller permitting it to move toward and from the side of the core without changing its angle to the plane of the core, and means for feeding said roller along the side of the core.

14. In a machine of the character described, the combination of a revoluble core, a tire fabric shaping roller whose face is oblique to the path of the material at the point of contact, a support for said roller permitting it to move toward and from the side of the core without changing its angle to the plane of the core and without changing its obliquity thereto.

15. In a machine of the character described, the combination of a revoluble core, a tire fabric shaping tool, a support for said tool permitting it to move around the core without changing its angle to the plane of the core, and means for feeding said tool along the side of the core the movement of said support being transverse to the line of feed.

16. In a machine of the character described, the combination of a revoluble core, a tire fabric shaping roller, a support for said roller permitting it to move around the core without changing its angle to the plane of the core, and means to feed said roller along the side of the core, the movement of said support being transverse to the line of feed.

17. In a machine of the character described, the combination of a revoluble core, a tire fabric shaping roller whose face is oblique to the path of the material at the point of contact, a support for said roller permitting it to move toward and from the side of the core without changing its angle to the plane of the core, and means to feed said roller along the side of the core the movement of said support being transverse to the line of feed.

18. In a machine of the character described, the combination of a revoluble core, a tire fabric shaping roller whose face is oblique to the path of the material at the point of contact, a support for said roller permitting it to move toward and from the side of the core without changing its angle to the plane of the core and without changing the obliquity thereof, and means to feed said roller along the side of the core, the movement of said support being transverse to the line of feed.

19. In a machine of the character described, the combination of a revoluble core, a tire fabric shaping tool, a pivoted support for said tool, and means to feed said tool in a direction parallel to the axis of said support to cause it to traverse the side of the core and shape the fabric thereto.

20. In a machine of the character described, the combination of a revoluble core, a tire fabric shaping roller, a pivoted support for said roller, and means to feed said roller in a direction parallel to the axis of said support to cause it to traverse the side of the core and shape the fabric thereto.

21. In a machine of the character described, the combination of a revoluble core, a tire fabric shaping tool, a pivoted support for said tool permitting the tool to move toward and from the side of the core in a direction at right angles to the plane of the core, and means to feed said tool in a direction parallel to the axis of said support to cause it to traverse the side of the core and shape the fabric thereto.

22. In a machine of the character described, the combination of a revoluble core, a tire fabric shaping roller, a pivoted support permitting the roller to move toward and from the side of the core in a direction at right angles to the plane of the core, and means to feed said roller in a direction parallel to the axis of said support to cause it to traverse the side of the core and shape the fabric thereto.

23. In a machine of the character described, the combination of a revoluble core, a tire fabric shaping roller whose face is oblique to the material at the point of contact, a pivoted support for said roller, and means to feed said roller in a direction parallel to the axis of said support to cause it to traverse the side of the core whereby the obliquity is not changed.

24. In a machine of the character described, the combination of a revoluble core, a tire fabric shaping roller whose face is oblique to the path of the material at the point of contact, a pivoted support for said roller permitting the roller to move toward and from the side of the core in a direction at right angles to the plane of the core, and means to feed said roller in a direction parallel to the axis of said support to cause it to traverse the side of the core whereby the obliquity is not changed.

25. In a machine of the character described, the combination of a revoluble core, a tire fabric shaping roller located in a plane oblique to the path of rotation of the core at the point of action to such rollers on the core, a support for said roller mounted to permit rocking of the roller toward and from the side of the core in a direction at right angles to the plane of the core, means pressing said roller toward the side of the core, and means to cause said roller to traverse the side of the core to shape and apply the fabric thereto.

26. In a machine of the character described, the combination of a revoluble core, a roller adapted to shape the tire fabric to the side of the core, the plane of such roller being parallel at all times to the axis of the core, and means to cause said roller to traverse the side of the core in a direction non-radial to the core.

27. In a machine of the character described, the combination of a revoluble core, a roller adapted to shape the tire fabric to the side of the core, the plane of said roller being parallel at all times to the axis of the core and oblique to the path of movement of the material, and means to cause said roller to traverse the side of the core in a direction non-radial to the core.

28. In a machine of the character described, the combination of a revoluble core, a roller adapted to shape the tire fabric to the side of the core, the plane of said roller being parallel at all times to the axis of the core and oblique to the path of movement of the material, and means to cause said roller to traverse the side of the core in a direction non-radial to the core whereby the obliquity remains the same.

29. In a machine of the character described, the combination of a revoluble core, a roller adapted to shape the tire fabric to the side of the core, the plane of said roller being parallel to the axis of the core, a support for said roller permitting it to move toward and from the core in a direction at right angles to the plane of the core, and means to cause said roller to traverse the side of the core in a direction non-radial to the core to shape and apply the fabric to the side of the core.

30. In a machine of the character described, the combination of a revoluble core, a movable plate, horizontally arranged, pivotal supports on said plate, vertical stitcher carriers mounted on said pivotal supports, stitchers on said carriers, and means to move said stitcher carriers toward and from one another.

31. In a machine of the character described, the combination of a revoluble core, a movable plate, horizontally arranged pivotal supports on said plate, vertical stitcher carriers mounted on said pivotal supports, stitchers on said carriers, means to move said stitcher carriers toward and from one another, and hand operated means to separate said carriers.

32. In a machine of the character described, the combination of a revoluble core, a movable plate, pivotal supports on said plate, vertical stitcher carriers mounted on said pivotal supports, stitchers on said carriers, means to move said stitcher carriers toward and from one another, and hand operated means to separate said carriers comprising a link connected to one carrier, a bell crank lever on the other carrier, and a pivotal connection between said link and said bell crank lever.

33. In a machine of the character described, the combination of a revoluble core, a movable plate, horizontally arranged pivotal supports on said plate, vertical stitcher carriers mounted on said pivotal supports, stitchers on said carriers, means to move said stitcher carriers toward and from one another, and hand operated means to separate said carriers comprising a link connected to one carrier, a bell crank lever on the other carrier, and a pivotal connection between said link and said bell crank lever.

34. A stitcher roller for tire making machines movable over the tire, comprising a disk, a shaft for said disk, a bearing for said disk on said shaft, and means normally tending to maintain said disk in one position but permitting it to move on said shaft axially in one direction only from said position.

35. A stitcher roller for tire making machine comprising a disk, a hub thereon, a shaft, a bearing located in said hub on said shaft, the bearing being movable along said shaft, a shoulder on said shaft against which said bearing normally rests, a cap on the outer end of said shaft, a spring located between said bearing and said cap and means to advance the stitchers over the surface of the tire.

36. In an apparatus for making tire carcasses, the combination of a revoluble core, a base upon which the core is mounted, a movable carriage on said base, a sliding plate on said carriage, tire fabric shaping mechanism on said plate, a feed screw in said base, a nut on said carriage contacting said feed screw and a rotatable shaft on said base, means for operating said feed screw from said shaft in either direction, means under control of the operator for connecting said shaft and said feed screw, and means for advancing the plate on the carriage during the forming of the tire fabric on the core.

37. In a machine of the character described, the combination of a rotatable core, and means to shape the fabric to the side of the core, including a shaping tool, means for moving the shaping tool toward the center of the core, and a support for the tool mounted to permit lateral movement thereof with respect to the plane of the core, the axis of the tool being at all times below the axis of the core.

38. In a machine of the character described the combination of a revoluble core, a shaping tool, means for moving said shaping tool toward the center of the core, and a mounting for said tool so that the axis thereof is parallel to but at one side of a radius of the core.

39. In a machine for manufacturing tires, the combination of a core, a movable carriage, power means to move said carriage toward and away from the axis of the core, a spinning roller on the carriage, and means to advance said spinning roller at differing speeds toward the core.

40. In a machine for manufacturing tires, the combination of a core, a carriage movable in relation thereto, fabric pressing devices on the carriage and means for effecting advancing movement of the pressing devices including instrumentalities for effecting different speeds of advance of the pressing devices and power means to move the carriage and pressing devices away from the core.

41. In a machine for manufacturing tires, the combination of a core, a carriage movable in relation thereto, fabric pressing devices on the carriage, and means for effecting advancing movement of the pressing devices while the carriage is stationary including instrumentalities for effecting different speeds of advance of the pressing devices, and independent power means to move the carriage and pressing device away from the core.

42. In a machine for manufacturing tire casings, a carriage, power driven mechanism for advancing said carriage toward and away from the core, a sliding plate on said carriage, power actuated means to advance said plate on the carriage, and a spinning roller on said sliding plate.

43. In a machine for manufacturing tire casings, a carriage, power driven means to advance said carriage toward the axis of the core, means to interrupt said driving connections, a secondary carriage on said first named carriage, a spinning roller pivotally mounted on said second named carriage, and means for moving said roller about its pivot to change the angle of said spinning roller with reference to the core.

44. In a machine for manufacturing tire casings, a carriage, feed mechanism for said carriage, driving mechanism for said feed mechanism, means for connecting or disconnecting said driving mechanism from said feed mechanism, spinning rollers carried on said carriage, pivots for said spinning rollers, means for maintaining said spinning rollers in one position of angularity with respect to the core, and a device for moving said spinning rollers about their pivots to change the angularity of the spinning rollers with reference to the core.

45. In a machine for manufacturing tire casings, a core, mechanism for shaping the fabric to the core, power operated means for advancing said mechanism over the core, the speed of said power operated means being variable at different stages of advance of said mechanism, means for changing the angle of the shaping mechanism, and power operated means for withdrawing the shaping mechanism from the core.

46. A tire making machine comprising a core, elements for shaping the fabric to the core, means for moving the elements toward the center of the core, means for varying the speed of movement of said elements, means for changing the angle at which said elements are presented to the core, and power operated means adapted to move said elements away from the core.

WILLIAM C. STEVENS.

Witnesses:
J. J. SHEA,
C. L. ELY.